(12) United States Patent
Van der Walt et al.

(10) Patent No.: US 11,959,637 B2
(45) Date of Patent: Apr. 16, 2024

(54) DEVICES, SYSTEMS, FACILITIES AND PROCESSES FOR CO2 POST COMBUSTION CAPTURE INCORPORATED AT A DATA CENTER

(71) Applicant: NEXT CARBON SOLUTIONS, LLC, Houston, TX (US)

(72) Inventors: Ivan Van der Walt, Conroe, TX (US); Ben Heichelbech, Houston, TX (US); Vikrum Subra, Houston, TX (US); Connor Rivard, Houston, TX (US)

(73) Assignee: NEXT CARBON SOLUTIONS, LLC, Houston, TX (US)

( * ) Notice: Subject to any disclaimer, the term of this patent is extended or adjusted under 35 U.S.C. 154(b) by 0 days.

(21) Appl. No.: 18/131,311

(22) Filed: Apr. 5, 2023

(65) Prior Publication Data

US 2023/0324043 A1    Oct. 12, 2023

Related U.S. Application Data

(60) Provisional application No. 63/327,939, filed on Apr. 6, 2022.

(51) Int. Cl.
*B01D 53/02* (2006.01)
*B01D 53/26* (2006.01)
(Continued)

(52) U.S. Cl.
CPC .......... *F23J 15/006* (2013.01); *B01D 53/26* (2013.01); *B01D 2257/504* (2013.01);
(Continued)

(58) Field of Classification Search
CPC ...... F23J 15/006; F23J 2215/50; B01D 53/26; B01D 2257/504; B01D 2257/80; B01D 2258/0283; F28D 21/001
See application file for complete search history.

(56) References Cited

U.S. PATENT DOCUMENTS 4,249,915 A    2/1981  Sircar et al.
4,489,679 A *  12/1984 Holt .......................... F22D 1/12
                                                              236/14
(Continued)

FOREIGN PATENT DOCUMENTS

WO    WO2014/073004 A2    5/2014
WO    WO2022/13197 A1     1/2022
WO    WO2022/050918 A1    3/2022

OTHER PUBLICATIONS

International Search Report from PCT/US2022/53201, dated Mar. 27, 2023, 2 pages.
(Continued)

*Primary Examiner* — Christopher P Jones
(74) *Attorney, Agent, or Firm* — K&L Gates LLP

(57) ABSTRACT

Devices, systems, facilities, and methods for post combustion capture of emissions from a natural gas generator used to power a data center disclosed herein. The facility includes a process for capturing and sequestering $CO_2$ from a post combustion capture of the natural gas generator utilizing the heat from the flue gas and from the data center. The $CO_2$ rich streams from the post combustion capture system are sent to sequestration of some form via a sequestration compressor, thereby reducing the overall emissions from the facility.

10 Claims, 1 Drawing Sheet

(51) Int. Cl.
*F23J 15/00* (2006.01)
*F28D 21/00* (2006.01)

(52) U.S. Cl.
CPC .. *B01D 2257/80* (2013.01); *B01D 2258/0283* (2013.01); *F23J 2215/50* (2013.01); *F28D 21/001* (2013.01)

(56) References Cited

U.S. PATENT DOCUMENTS

| | | | | |
|---|---|---|---|---|
| 4,677,307 | A * | 6/1987 | Vadas | F01K 9/003 290/4 A |
| 6,048,509 | A | 4/2000 | Kawai et al. | |
| 6,248,794 | B1 | 6/2001 | Gieskes | |
| 9,102,534 | B2 | 8/2015 | McKenna | |
| 9,149,761 | B2 | 10/2015 | Northrop et al. | |
| 10,315,150 | B2 | 6/2019 | Huntington et al. | |
| 11,067,335 | B1 | 7/2021 | Van der Walt et al. | |
| 11,484,825 | B1 | 11/2022 | Heichelbech et al. | |
| 2003/0017088 | A1 * | 1/2003 | Downs | B01D 53/04 422/168 |
| 2003/0192343 | A1 | 10/2003 | Wilding et al. | |
| 2010/0139484 | A1 | 6/2010 | Li et al. | |
| 2010/0209997 | A1 * | 8/2010 | Newman | C12Y 402/01001 435/252.31 |
| 2010/0325958 | A1 | 12/2010 | Molaison | |
| 2014/0053565 | A1 | 2/2014 | Galasso et al. | |
| 2014/0053761 | A1 | 2/2014 | Galasso | |
| 2014/0360368 | A1 * | 12/2014 | Nakamoto | B01D 53/02 96/144 |
| 2016/0059180 | A1 | 3/2016 | Hamad | |
| 2016/0369674 | A1 | 12/2016 | Younes et al. | |
| 2017/0097189 | A1 | 4/2017 | Guy et al. | |
| 2017/0333814 | A1 | 11/2017 | Yancy et al. | |
| 2018/0094560 | A1 | 4/2018 | Williams et al. | |
| 2018/0274347 | A1 * | 9/2018 | Ricotta | E21B 43/34 |
| 2018/0320679 | A1 * | 11/2018 | Enis | F04B 41/02 |
| 2020/0022289 | A1 * | 1/2020 | Marazzo | F01D 15/10 |
| 2021/0098143 | A1 * | 4/2021 | Trojer | G21C 5/10 |
| 2021/0121826 | A1 | 4/2021 | Kolodji | |
| 2021/0325069 | A1 * | 10/2021 | Cotton | B60L 53/30 |
| 2022/0065160 | A1 | 3/2022 | Van der Walt et al. | |
| 2022/0305434 | A1 | 9/2022 | Van der Walt et al. | |
| 2023/0201757 | A1 * | 6/2023 | Alissa | B01D 53/0446 95/139 |
| 2023/0216887 | A1 * | 7/2023 | Strong | G06N 7/01 726/4 |

OTHER PUBLICATIONS

International Written Opinion from PCT/US2022/53201, dated Mar. 27, 2023, 4 pages.
International Preliminary Report on Patentability and Written Opinion from PCT/US2020/046879, dated Mar. 8, 2023, 6 pages.
International Preliminary Report on Patentability and Written Opinion from PCT/US2020/051269, dated Mar. 8, 2023, 16 pages.
International Preliminary Report on Patentability and Written Opinion from PCT/US2021/046817, dated Mar. 8, 2023, 4 pages.
International Preliminary Report on Patentability and Written Opinion from PCT/US2020/046879, dated Mar. 8, 2023, 7 pages.
IEAGHG Technical Report by IEA, Techno-Economic Evaluation of CO2 Capture in LNG Plants, IEA Greenhouse Gas R&D Programme, Oct. 2019, 198 pages.
Third Party Observation from PCT/US2020/051269, Filed Sep. 17, 2020, listing the IEAGHG Technical Report, 1 page.
Supplemental Explanation for Third Party Observation from PCT/US2020/051269, Filed Sep. 17, 2020, regarding the IEAGHG Technical Report, 4 pages.
Third Party Observation from PCT/US2021/046716, Filed Aug. 19, 2021, listing the IEAGHG Technical Report, 1 page.
Supplemental Explanation for Third Party Observation from PCT/US2021/046716, Filed Aug. 19, 2021, regarding the IEAGHG Technical Report, 3 pages.
International Search Report from PCT/US2023/15194, dated Jun. 15, 2023, 2 pages.
International Written Opinion from PCT/US2023/15194, dated Jun. 15, 2023, 4 pages.
International Search Report from PCT/US2023/15375, dated Jun. 14, 2023, 2 pages.
International Written Opinion from PCT/US2023/15375, dated Jun. 14, 2023, 6 pages.

* cited by examiner

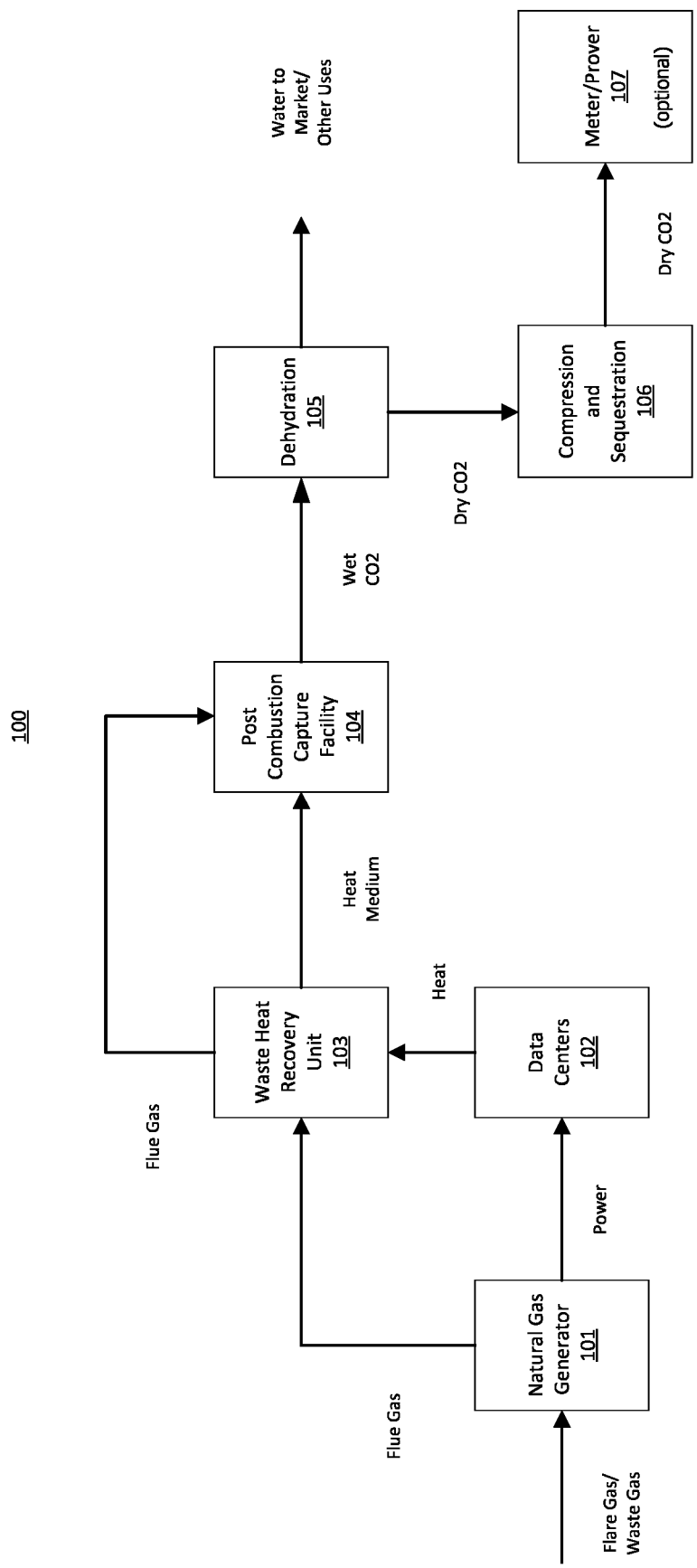

DEVICES, SYSTEMS, FACILITIES AND PROCESSES FOR CO2 POST COMBUSTION CAPTURE INCORPORATED AT A DATA CENTER

CROSS REFERENCE TO RELATED APPLICATIONS

The present application claims the benefit of priority to U.S. Provisional Application No. 63/327,939 filed Apr. 6, 2022, the entirety of which is incorporated herein by reference.

BACKGROUND

Industrial facilities contribute to greenhouse gases through the various processes. Greenhouse gases may comprise various gaseous components such as carbon dioxide, methane, nitrous oxide, hydrofluorocarbons, perfluorocarbons, and sulfur hexafluoride that absorb radiation, trap heat in the atmosphere, and generally contribute to undesirable environmental greenhouse effects.

Industrial facilities often implement certain forms of hydrocarbon reduction technologies such as scrubbers and flares. However, typically these facilities do not have a dedicated process specifically designed to reduce most greenhouse gas emissions as well as implement synergies to reduce the cost of direct air capture.

Accordingly, there is a need for improving the overall efficiency of facilities while reducing greenhouse gas emissions.

SUMMARY

The present disclosure provides a data center used for cloud storage, cryptocurrency mining, and other applications that is powered by waste gas/flare gas from a wellhead of a facility such as a natural gas production facility. The waste gas/flare gas may be sent to one or more natural gas generators, which generate power to be provided to the data center.

In a further aspect of the present disclosure, which may be combined with any other aspect listed herein unless specified otherwise, flue gas from the natural gas generators may be sent to the post combustion capture facility for carbon dioxide ($CO_2$) removal.

In another aspect of the present disclosure, which may be combined with any other aspect listed herein unless specified otherwise, waste heat from the data center is combined with the waste heat from the flue gas through a waste heat recovery unit transferring the waste heat into a heat medium such as steam or hot oil and used for regeneration in the post combustion capture facility.

In a still further aspect of the present disclosure, which may be combined with any other aspect listed herein unless specified otherwise, the entrained steam used in the desorption at the post combustions capture facility may be separated at a water dehydration unit, and the water may be redirected for use in other processes.

In another aspect of the present disclosure, which may be combined with any other aspect listed herein unless specified otherwise, the dry $CO_2$ stream from the dehydration unit may be sent to a meter and/or a prover to determine the accurate amount of $CO_2$ to be compressed and sequestered.

In a further aspect of the present disclosure, which may be combined with any other aspect listed herein unless specified otherwise, the dry $CO_2$ stream may then be sent to be compressed and sequestered.

Each aspect, feature, and/or embodiment disclosed herein may be combined with any other aspect, feature, and/or embodiment described herein unless specified otherwise. Additional features and advantages of the disclosed devices, systems, and processes are described in and will be apparent from the following detailed description and the figures. The features and advantages described herein are not all-inclusive and in particular many additional features and advantages will be apparent to one of ordinary skill in the art in view of the figures and description. Also, any particular embodiment does not have to have all of the advantages listed herein. Moreover, it should be noted that the language used in the specification has been principally selected for readability and instructional purposes and not to limit the scope of the disclosed subject matter.

BRIEF DESCRIPTION OF THE FIGURES

Understanding that the FIGURES depict only typical embodiments of the invention and are not to be considered to be limiting the scope of the present disclosure, the present disclosure is described and explained with additional specificity and detail through the use of the accompanying FIGURES. The FIGURE is listed below.

FIG. 1 illustrates an exemplary schematic of a combined post combustion capture unit with the operation of a data center.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One of ordinary skill in the art could implement numerous alternate embodiments, which would still fall within the scope of the claims. To the extent that any term is referred to in this patent in a manner consistent with a single meaning, that is done for the sake of clarity and illustration only, and it is not intended that such claim term be limited to that single meaning.

FIG. 1 illustrates an exemplary schematic of a post combustion capture facility alongside a data center 102 with the captured $CO_2$ being sent to sequestration/storage. The data center 102 may be used for cloud storage, cryptocurrency mining, and other applications.

Waste/flare gas from the facility may be sent to a natural gas generator(s) 101 to be used for power generation to power the data center 102. Specifically, the waste/flare gas is burned and the power generated therein may be transmitted to the data center 102. The flue gas from the natural gas generator(s) 101 may be directed to a waste heat recovery unit (WHRU) 103, where the heat is recovered and combined with the heat from the data center 102. In one embodiment, the WHRU 103 includes a blower to move the flue gas through the unit. The WHRU 103 may also include a heat recovery steam generator to generate steam for regeneration in the post combustion capture facility 104.

The flue gas is then sent to the post combustion capture facility 104 for $CO_2$ removal by any commercially available process. The waste heat from the WHRU 103 is sent to the post combustion capture facility 104 for regeneration. In one embodiment, $CO_2$ is captured by the post combustion capture facility 104 into a saturated $CO_2$ stream or entrained steam.

The saturated $CO_2$ stream from the post combustion capture facility 104 may be sent to a dehydration unit 105. Water from the saturated $CO_2$ stream removed by the dehydration unit 105 may be sent to market or for other uses. The dry $CO_2$ stream from the dehydration unit 105 may be directed to a sequestration compression unit 106 to be sequestered. Downstream of the sequestration compression unit 106 and prior to sequestration, the dry $CO_2$ stream may be sent to a meter and/or a prover 107 to be measured. For example, a prover configured for metering and proving quantity and quality of the dry $CO_2$ stream may be utilized.

As used in this disclosure and the appended claims, the singular forms "a," "an" and "the" include plural referents unless the context clearly dictates otherwise. Thus, for example, reference to "an ingredient or "the ingredient" means "at least one ingredient" and includes two or more ingredients.

The words "comprise," "comprises" and "comprising" are to be interpreted inclusively rather than exclusively. Likewise, the terms "include," "including" and "or" should all be construed to be inclusive, unless such a construction is clearly prohibited from the context. Nevertheless, the compositions disclosed herein may lack any element that is not specifically disclosed herein. Thus, a disclosure of an embodiment using the term "comprising" includes a disclosure of embodiments "consisting essentially of" and "consisting of" the components identified. A composition "consisting essentially of" contains at least 75 wt. % of the referenced components, preferably at least 85 wt. % of the referenced components, more preferably at least 95 wt. % of the referenced components, most preferably at least 98 wt. % of the referenced components.

The terms "at least one of" and "and/or" used in the respective context of "at least one of X or Y" and "X and/or Y" should be interpreted as "X," or "Y," or "X and Y." For example, "at least one of honey or chicory root syrup" should be interpreted as "honey without chicory root syrup," or "chicory root syrup without honey," or "both honey and chicory root syrup."

Where used herein, the terms "example" and "such as," particularly when followed by a listing of terms, are merely exemplary and illustrative and should not be deemed to be exclusive or comprehensive. The many features and advantages of the present disclosure are apparent from the written description, and thus, the appended claims are intended to cover all such features and advantages of disclosure. Further, since numerous modification and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable no or in the future.

The invention is claimed as follows:

1. A system for treating, compressing, and sequestering carbon dioxide ($CO_2$) derived from post combustion capture from a natural gas generator, the system comprising: a data center configured to receive power from the natural gas generator for operation; at least one waste heat recovery unit configured to receive flue gas from the natural gas generator and heat from the data center, wherein the at least one waste heat recovery unit is configured to recover heat from the flue gas and from the heat generated by the data center, and the at least one waste heat recovery unit is further configured to send the heat recovered from the flue gas and from the heat generated by the data center to a post combustion capture facility for regeneration; the post combustion capture facility configured to capture the $CO_2$ from the flue gas from the at least one waste heat recovery unit into a $CO_2$ stream; a dehydration unit configured to remove water from the $CO_2$ stream to provide a dry $CO_2$ stream; and a sequestration compression unit configured to convey the dry $CO_2$ stream towards a sequestration site.

2. The system of claim 1, wherein the at least one waste heat recovery unit comprises a heat recovery steam generator configured to generate steam for regeneration.

3. The system of claim 2, wherein the water separated from the $CO_2$ stream by the dehydration unit is directed to the heat recovery steam generator.

4. The system of claim 1, further comprising a blower configured to move the flue gas through the at least one waste heat recovery unit.

5. The system of claim 1, wherein the data center is configured for cloud storage and/or cryptocurrency mining.

6. A method for treating, compressing, and sequestering carbon dioxide ($CO_2$) derived from post combustion capture from a natural gas generator, the method comprising:
receiving, by a data center, power from the natural gas generator for operation;
receiving, by at least one waste heat recovery unit, flue gas from the natural gas generator and heat from the data center, wherein the at least one waste heat recovery unit is configured to recover heat from the flue gas and from the heat generated by the data center;
sending, by the at least one waste heat recovery unit, the heat recovered from the flue gas and from the heat generated by the data center to a post combustion capture facility for regeneration;
capturing, by the post combustion capture facility, the $CO_2$ from the flue gas into a $CO_2$ stream;
removing, by a dehydration unit, water from the $CO_2$ stream to provide a dry $CO_2$ stream; and
conveying, by a sequestration compression unit, the dry $CO_2$ stream towards a sequestration site.

7. The method of claim 6, wherein the at least one waste heat recovery unit comprises a heat recovery steam generator configured to generate steam for regeneration.

8. The method of claim 7, further comprising directing, by the dehydration unit, the water separated from the $CO_2$ stream to the heat recovery steam generator.

9. The method of claim 6, wherein the at least one heat recovery unit includes a blower configured to move the flue gas through the at least one waste heat recovery unit.

10. The method of claim 6, wherein the data center is configured for cloud storage and/or cryptocurrency mining.

* * * * *